United States Patent
Giumelli

(10) Patent No.: US 7,300,085 B2
(45) Date of Patent: Nov. 27, 2007

(54) MOTOR VEHICLE SAFETY BARRIER MOUNTING

(75) Inventor: Mark Anthony Giumelli, Camden Park (AU)

(73) Assignee: Rees Operations Pty Ltd (AU)

( * ) Notice: Subject to any disclaimer, the term of this patent is extended or adjusted under 35 U.S.C. 154(b) by 273 days.

(21) Appl. No.: 10/537,735

(22) PCT Filed: Dec. 17, 2002

(86) PCT No.: PCT/AU02/01696

§ 371 (c)(1),
(2), (4) Date: Jun. 7, 2005

(87) PCT Pub. No.: WO2004/054851

PCT Pub. Date: Jul. 1, 2004

(65) Prior Publication Data

US 2006/0108815 A1    May 25, 2006

(51) Int. Cl.
*B60R 7/02* (2006.01)

(52) U.S. Cl. .............................. 296/24.43; 160/DIG. 2

(58) Field of Classification Search ............. 296/24.43, 296/24.42; 280/749; 160/DIG. 2
See application file for complete search history.

(56) References Cited

U.S. PATENT DOCUMENTS 2,998,279 A * 8/1961 Mateny ................... 296/24.43
4,919,467 A * 4/1990 Guimelli .................. 296/24.43
5,876,064 A * 3/1999 Ament et al. ............... 280/749
6,059,313 A   5/2000 Coogan et al.
2007/0057499 A1* 3/2007 Fengel et al. ............... 280/749

FOREIGN PATENT DOCUMENTS

AU    583738    1/1988
AU    750202    11/1999

* cited by examiner

Primary Examiner—Jason S Morrow
(74) Attorney, Agent, or Firm—Stephen C. Beuerle; Procopio Cory Hargreaves & Savitch LLP

(57) ABSTRACT

A improved form of attachment for a motor vehicle safety screen assembly which includes a screen having a perimeter frame (12) of tubular metal and an in fill panel (13) extending between the perimeter frame members, and a plurality of metal securing straps (15) which are connected to the frame (12) of the screen by connector brackets (20) each mounted on a bush (22) which is fitted on a respective frame member of the frame (12), wherein each of the brackets (20) can be rotated about the axis of their associated bush (22) to positions on opposites sides of the screen. The bushes (22) are made of two hinged portions which can be opened to facilitate attachment to the frame member and then subsequently closed and clipped together.

14 Claims, 7 Drawing Sheets

MOTOR VEHICLE SAFETY BARRIER MOUNTING

This invention relates to an improved mounting bracket for attachment to a perimeter frame member of a safety screen or barrier for use in a motor vehicle. The invention concerns safety screens of the type wherein a mesh in-fill panel is secured to a tubular metal peripheral frame and which, when mounted within the vehicle, extends transversely from side to side and from the roof to the floor of the vehicle and against which any unrestrained forwardly moving load can impact in a situation where the vehicle comes to a sudden halt or suddenly decelerates.

Metal mesh safety screens of the aforementioned kind are well known in the industry and have been in common use for many years. It is also known for these screens to be secured in position within the vehicle by means of either fixed metal brackets which are rigidly fixed to both the screen frame and an anchorage plate fixed, for example, in the floor of the vehicle, or by means of a plurality of elongate securing straps which extend rearwardly away from the screen and each of which is attached at its leading end to a fastening bolt which is itself mounted in a rigid mounting plate or lug fixedly secured, eg by welding, to the screen frame. The use of elongate securing straps in order to secure the screen in position is disclosed in our Australian patent specification number 583738 entitled "Vehicle Safety Screen Fixing Means". While the fixing system described in the aforesaid patent has proven generally satisfactory, the requirement to weld an attachment plate or lug to the screen frame member in order to permit attachment of the securing strap, adds to the manufacturing cost of the screen (as well as requiring an additional component part). Furthermore, the securing straps, when the screen is being moved either rearwards to its rear position or from its rear position to its forward position, will normally protrude from the sides of the screen frame and tend to catch on the vehicle interior trim, and may cause damage to the trim.

It would be desirable therefore if the elongate securing straps were able to be attached to the perimeter frame of the safety screen in a manner which avoids any welding and so that the securing straps can be moved to storage positions where they do not laterally protrude from the frame when the screen is being shifted from one position to another.

It is the main object of the present invention therefore to provide an improved form of attachment which will allow the elongate securing strap to be secured to a perimeter frame member of the screen or barrier in a simple and inexpensive manner and which will allow the strap to be readily moved to an out-of-use position to in turn allow the screen to be conveniently shifted from one position to another.

It is another object of the present invention to provide an improved form of attachment for securing an elongate securing strap to a perimeter frame member of a safety screen which is designed to allow the strap to be rotated between out-of-use positions on either side of the mesh in-fill panel of the screen.

It is yet another object of the present invention to provide an improved attachment bracket for attaching an elongate securing strap to a perimeter frame member of a vehicle safety screen, which is separate from and does not need to be rigidly fixed, eg by welding, to the screen frame itself, and no special attachment point is required on the screen frame.

Broadly, according to this invention therefore, there is provided an improved motor vehicle safety screen of the type comprising a metal mesh in-fill panel secured to a tubular metal perimeter frame, a plurality of securing straps for securing the frame to the roof and floor of the vehicle, and attachment means for connecting one end of each said strap to a respective frame member of the perimeter frame, the other end of each said strap being adapted for connection to a respective anchorage in the vehicle floor or roof, the improvement wherein said attachment means of at least one of the straps includes:

an outer connector bracket rotatable about an axis coinciding with the axis of its associated said frame member and having an approximately C-shaped body portion terminating in a pair of spaced apart outwardly extending flanged ends in face to face relationship, and an inner bush non-rotatably mounted on the associated frame member and having a cylindrical bearing surface, said body portion of the bracket surrounding said bush and engaging said bearing surface, whereby said bracket along with its attached securing strap is able to bodily rotate around its said respective frame member, and wherein said one end of the or each said securing strap is fastened between the flanged ends of a respective said bracket.

Preferably the end of the securing strap is pivotally mounted between opposed parallel flanges which project radially from the ends of the bracket, by means of a fastening bolt and nut, whereby the strap can rotate relative to its bracket about an axis which extends at right angles to its associated perimeter frame member.

In a preferred form of the invention, the connector bracket can rotate through an angle of at least 200 degrees, thereby allowing the securing strap to be bodily swung to positions on either side of the mesh in-fill panel. With the bracket rotated to a position where the strap lies in front of the mesh panel, the strap can be orientated so as to lie approximately parallel to the plane of the mesh in-fill panel, whereby the strap is able to nest within the recessed area defined by the perimeter frame which facilitates product packaging and transportation.

Preferably the bush has a square or rectangular through bore which is complemental to the shape of the outer profile of the perimeter frame member and frictionally engages therewith, and a cylindrical outer bearing surface for rotatably supporting the circular body portion of the bracket. The bush can be made from EPDM material having a shore hardness in the range 60 to 65 duro, or from a suitable nylon which has low moisture absorption, high dimensional stability and strength.

In order to more fully describe the present invention, a preferred embodiment thereof is described hereunder in some further detail with reference to and as illustrated in the accompanying drawings wherein.

Figure 1:
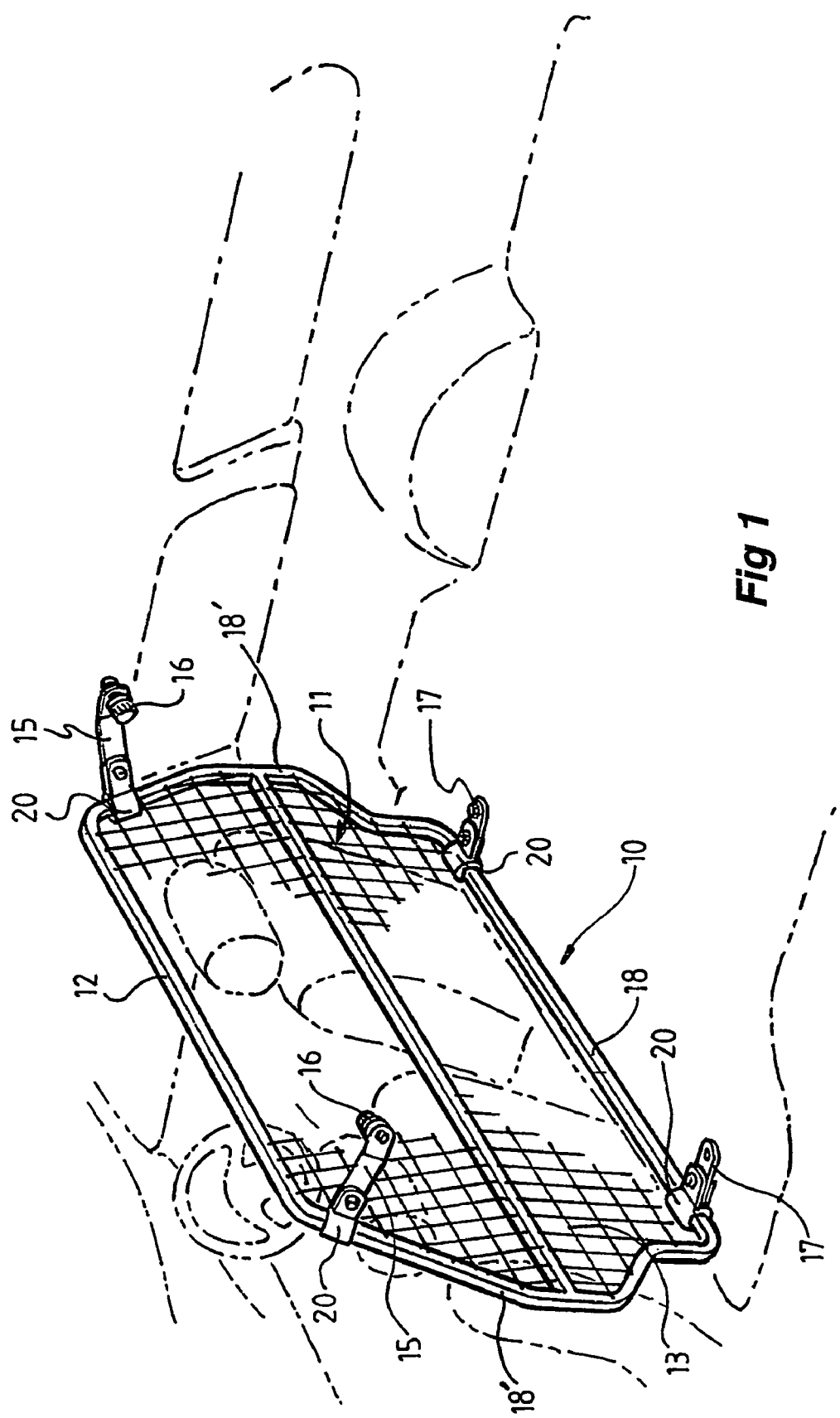
FIG. 1 is a perspective view of a safety screen mounted behind the front passenger seat of a vehicle.
Figure 6A:
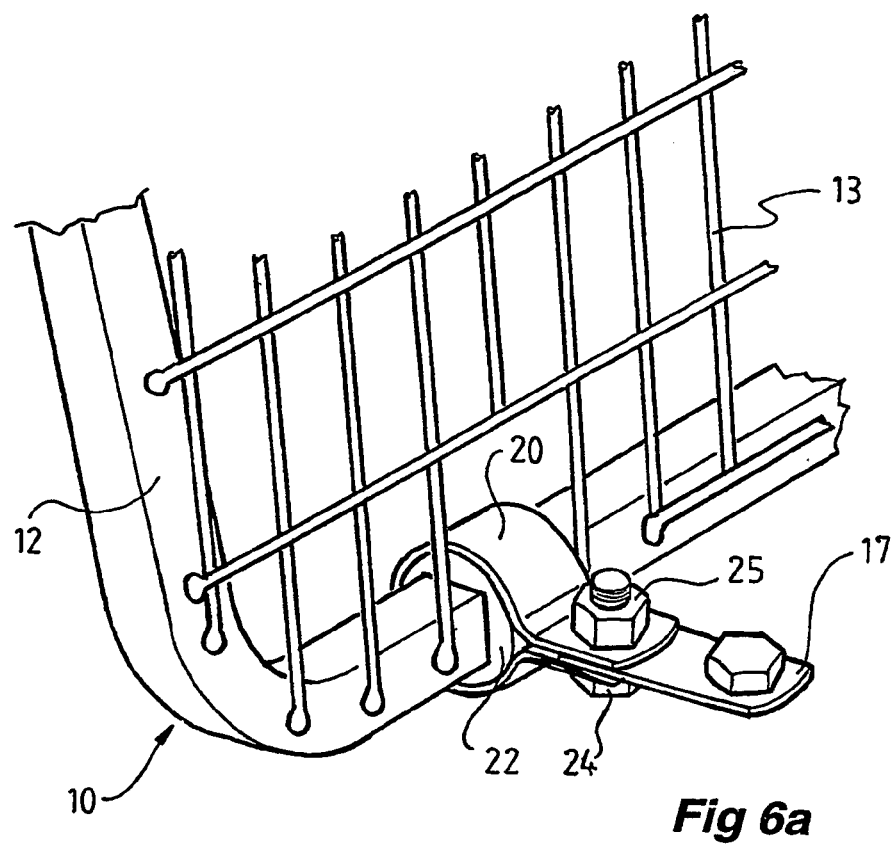
Figure 6B:
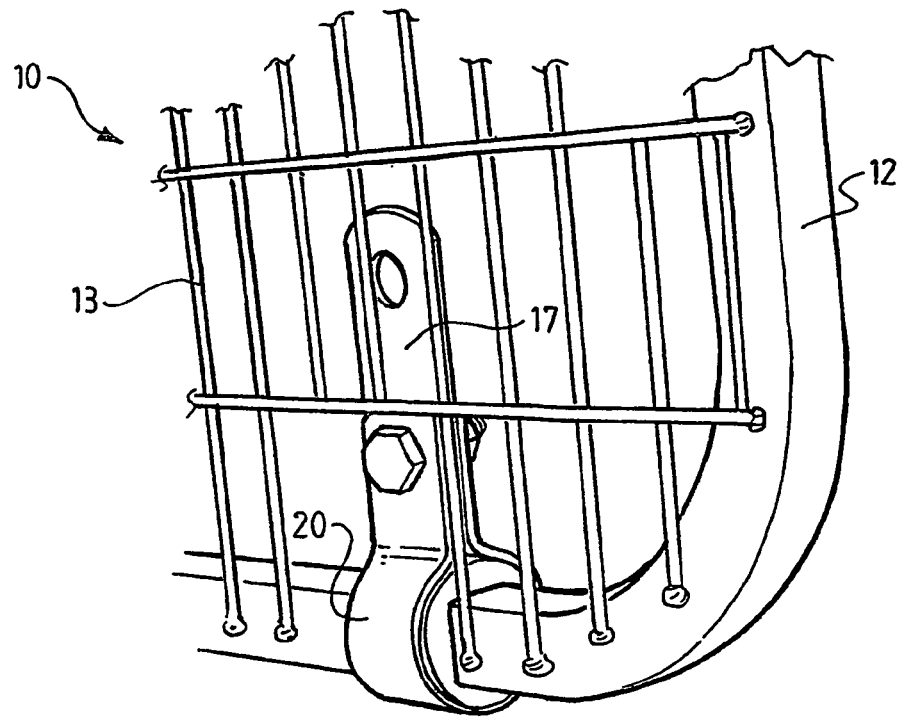
Figure 7A:
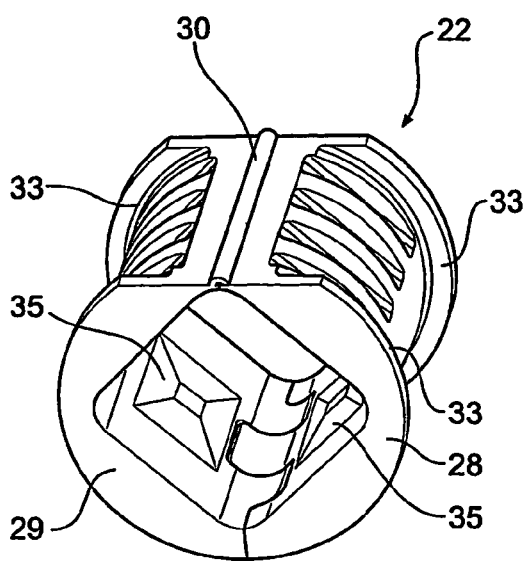
Figure 7B:
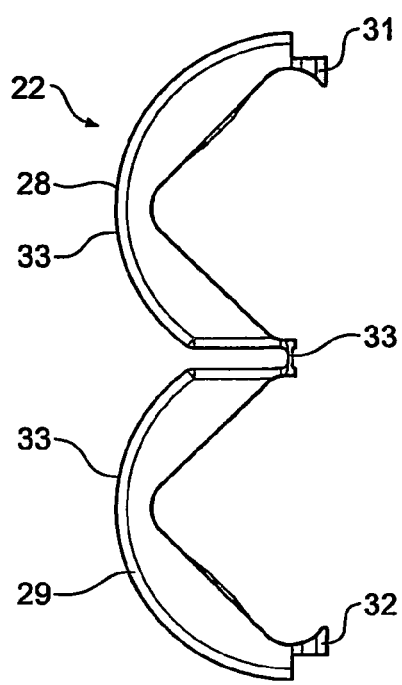
Figure 7C:
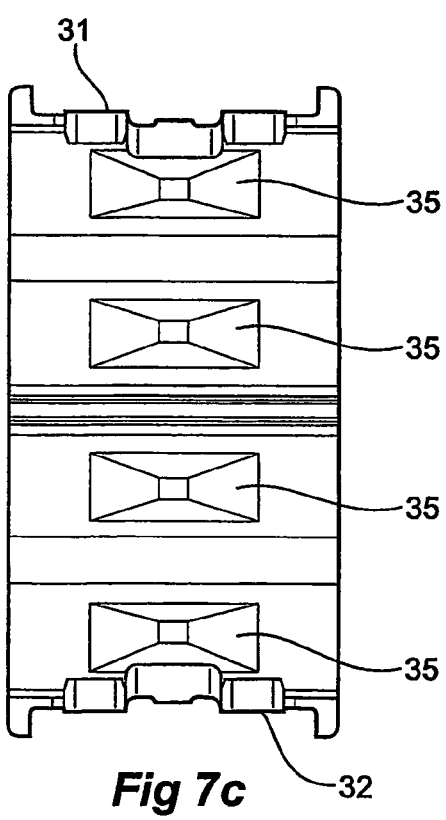
Figure 7D:
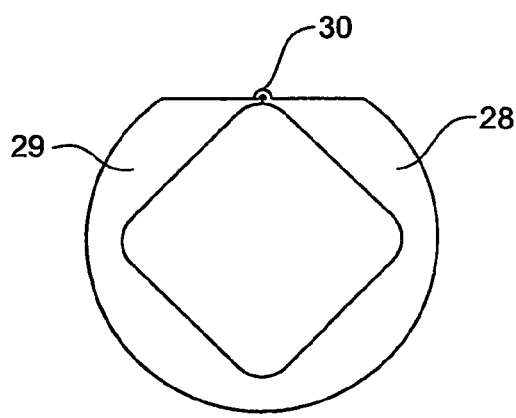

FIGS. 6(a) and (b) are perspective views of the screen assembly shown in FIG. 1 respectively showing one of the bottom securing straps in its rearwardly extending in-use position, and a packaging or transporting position wherein it has been rotated so as to lie in front of the mesh in-fill panel and approximately parallel therewith; while FIGS. 7(a)-(d) are views showing the internal bush which fits onto the screen frame and around which the bracket 20 is rotatably mounted.

In this embodiment, there is shown a two position safety screen assembly 10 arranged for securement in either a forward position immediately behind the front passenger seat of the vehicle or a rear position where it is mounted immediately behind the folded down rear passenger seat of the vehicle. The screen assembly 10 comprises a screen or barrier 11 having a perimeter frame 12 of tubular metal, and an in-fill panel 13 of heavy wire mesh which fills the closed area defined by the perimeter frame 12. The mesh in-fill panel 13 is normally welded to the rear surfaces of the tubular frame members of the perimeter frame 12.

The screen can be either essentially planar or formed with a slightly arched configuration—in accordance with known art.

As is also known, in both the front and rear mounted positions, the screen 11 is secured in position at four anchorage points, there being two upper fixing points in the cant-rails of the vehicle roof (or in the vicinity thereof) and also two lower fixing points laterally spaced apart in the floor of the vehicle.

The screen 11 is provided with a pair of upper metal securing straps 15 which, in both the front and rear mounting positions of the screen, are releasably secured at their trailing ends by means of quick release connectors 16 to respective anchorage plates (not shown) fixed in the roof panel of the vehicle.

The screen is also provided with a pair of lower short metal securing straps 17 which are removably secured at their trailing ends by means of securing bolts to anchorage plates in the floor of the vehicle. In this embodiment the upper straps 15 are used to secure the upper corner regions of the screen 11 to the vehicle roof, while the lower strap 17 are used to secure the lower corner regions of the screen 11 to the vehicle floor.

The forward end of each of the upper and lower securing straps, 15, 17 is pivotally attached to a bushed pivotal connector 19 which is mounted on a respective frame member 18, 18' of the perimeter frame 12, whereby the connector 19 and also the strap 15, 17 attached thereto can be selectively positioned in any one of a number of different angular positions relative to the screen frame 12.

Each connector 19 has a saddle bracket 20 formed of sheet metal and which comprises a C-shaped body portion 21 which is rotatably mounted on an inner axially split bush 22, the ends of the C-shape body portion 21 of the bracket 20 terminating in outwardly projecting spaced apart flanges 23, between which is clamped the leading end of the strap 15, 17 by means of a pivot pin or bolt 24 and an associated clamping nut 25. The bush 22 has an outer cylindrical bearing surface which is engaged by the inner cylindrical surface of the body portion 21 of the bracket 20, and a square or rectangular through passage 27 shaped to complement the perimeter shape of the frame member 18, 18' of the screen frame 12. The bush 22 is designed to form a tight friction fit with the screen frame member and is made from a rigid plastics material, which in this embodiment is Nylon 612 Zytel 158L.

Figure 3A:
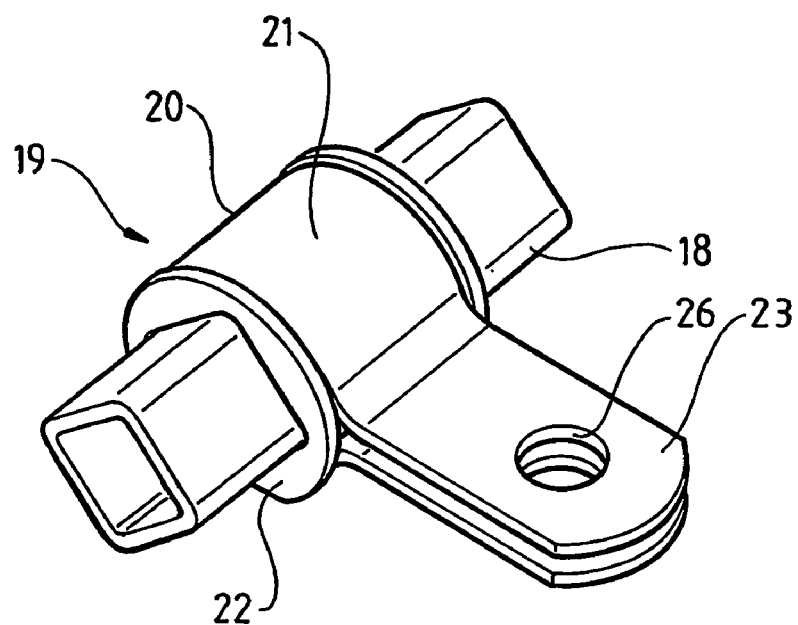
FIG. 3(a) is a perspective view of a bracket connector shown in its assembled position for attaching the securing strap to the perimeter frame of the safety screen.
Figure 3B:
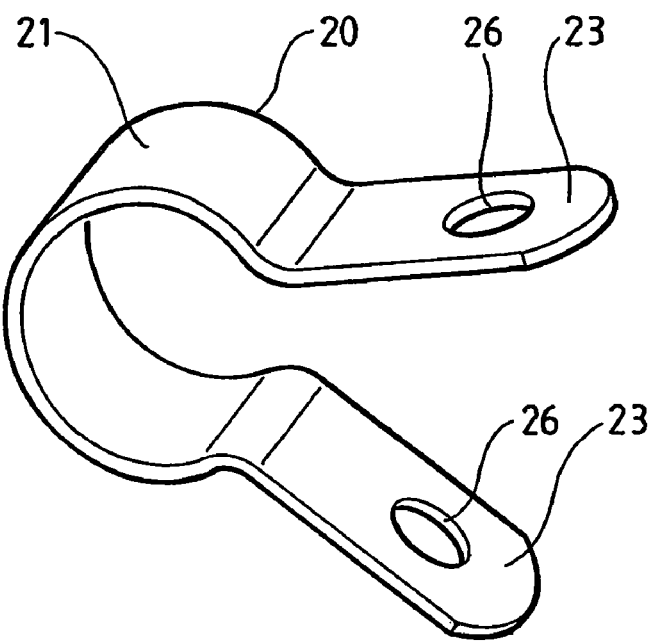
FIG. 3(b) is a perspective view of the bracket only prior to it being wrapped around its bush attached to its securing strap.

FIG. 3(b) shows the metal bracket 20 in its pre-assembled condition, with its flanged ends 23 diverging outwardly to facilitate the figment of the bracket around the bush 22.

Figure 2:
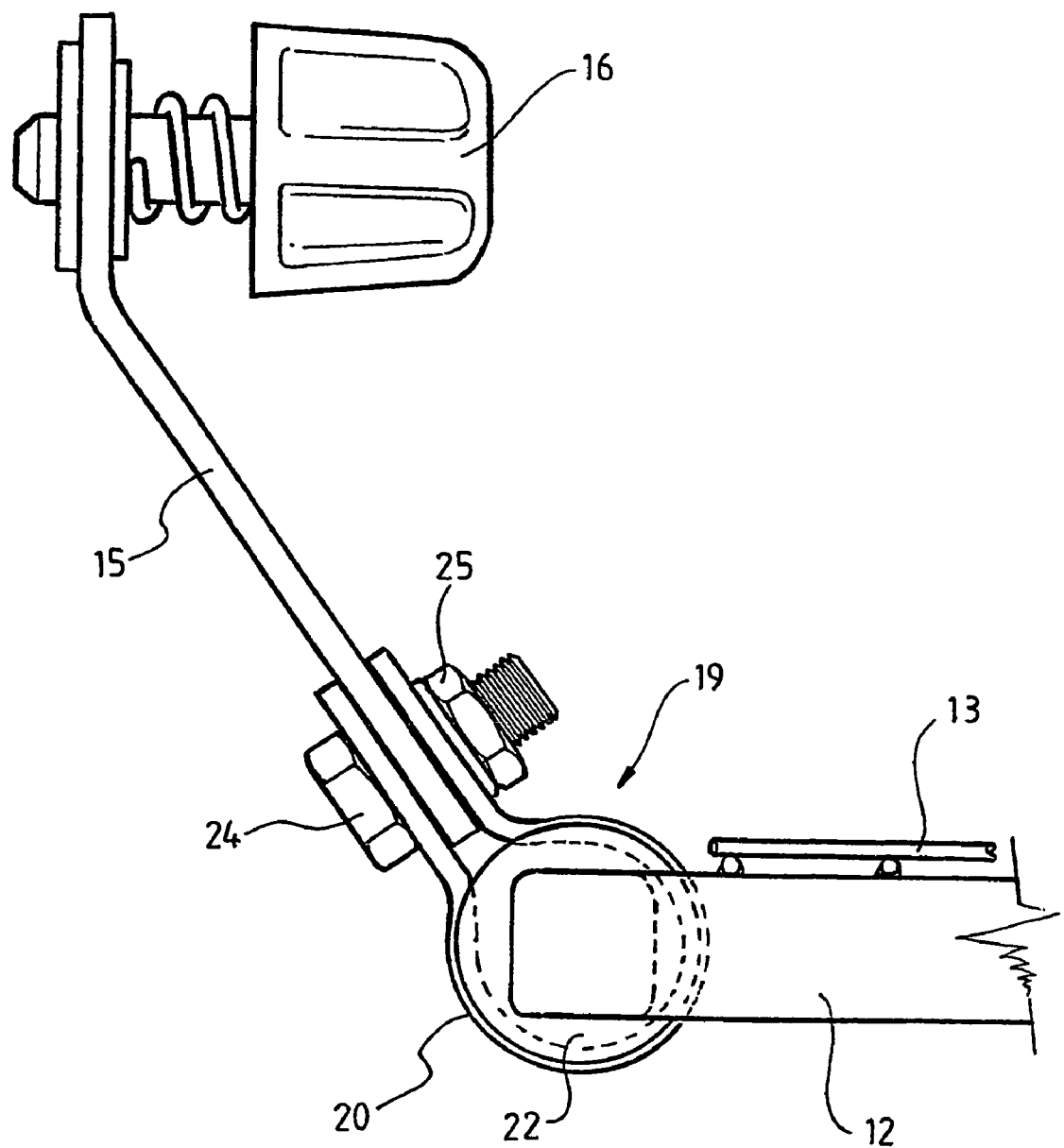
FIG. 2 is a fragmentary perspective view of the screen assembly shown in FIG. 1, showing one of the upper securing straps in its rearwardly projecting, ready to install position.

With reference to FIG. 2 of the drawings, this shows one of the upper securing straps 15 rotated to an outwardly laterally projecting in use position where it extends rearwardly away from the screen frame. In this position, the trailing end of the strap 15 is secured by simply engaging the quick release connector 16 to its respective anchorage point.

Figure 4:
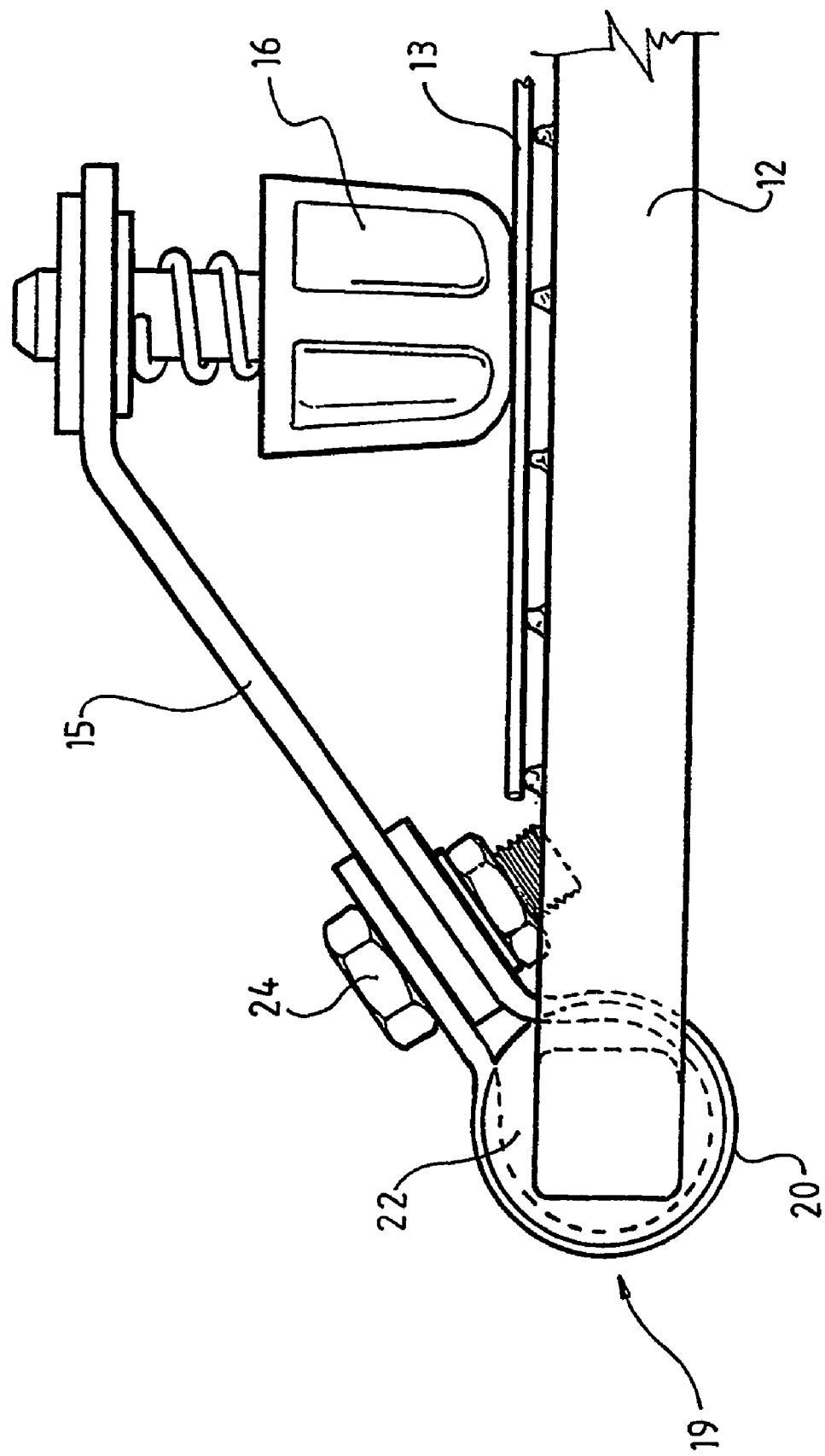
FIG. 4 is a fragmentary perspective view of the assembly shown in FIG. 1, with the upper securing strap rotated to a position where it lies inboard of the screen perimeter frame, so that the screen can be shifted from one position to another.

Referring to FIG. 4 of the drawings, this shows one of the upper straps 15 swung inwardly to an inboard position where it lies almost directly behind the mesh in-fill panel 13. In this position, the screen 11 can be readily moved from one position to its other position within the vehicle without the worry of the upper straps 15 catching on the trim of the vehicle interior.

Figure 5:
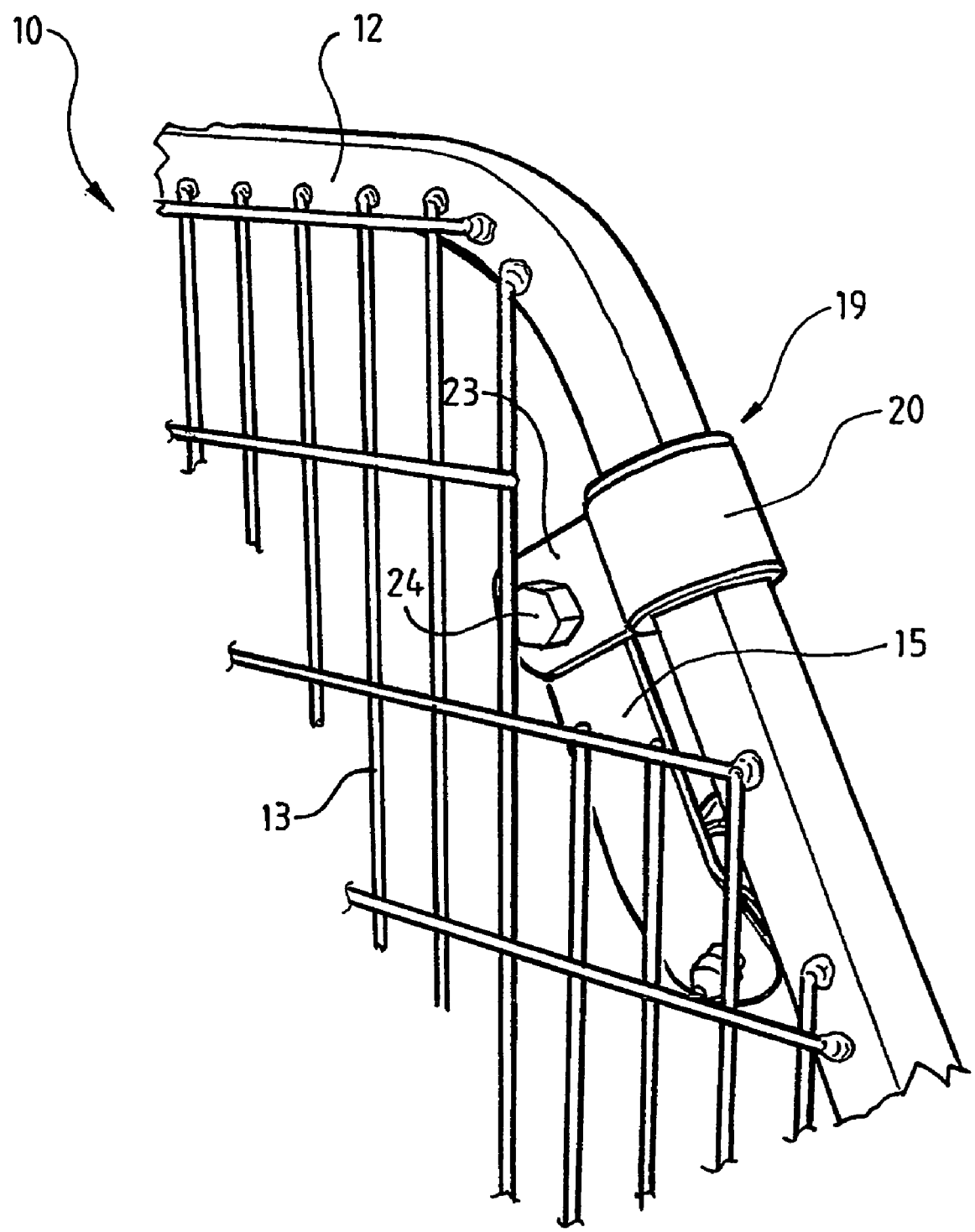
FIG. 5 is a fragmentary perspective view of the screen assembly shown in FIG. 1, wherein the upper securing strap has been rotated to a collapsed packaging position wherein it lies in front of the mesh in-fill panel of the screen adjacent its associated frame member.

Referring to FIG. 5 of the drawings, this shows the attachment bracket 20 rotated to a position where the upper securing strap 15 lies almost directly in front of the mesh in-fill panel 13, with the flanges 23 of the bracket 20 and also the strap 15 lying within the recessed area defined by the perimeter frame 12. The securing strap 15 is also rotated about its pivot bolt 24 to a collapsed or retracted position wherein it lies alongside its associated perimeter frame member, approximately parallel therewith. This facilitates packaging of the screen assembly 10.

Referring to FIGS. 6(a) and (b) of the drawings, these show one of the lower securing straps 17 in its rearwardly extending in use position wherein it projects rearwardly of the mesh in-fill panel 13 and a forwardly rotated retracted packaging position wherein it projects upwardly in front of the mesh in-fill panel 13 and lies within the area defined by the perimeter frame 12 of the screen 11.

The bushed bracket connectors 19 are fitted to their frame members 18, 18' at spaced locations therearound by firmly attaching the split bush 22 onto the frame member so that its bore grips the outer perimeter surfaces of the frame member. Thereafter the divergent flanged ends 23 of the saddle bracket 20 are located on opposite sides of the bush 22 and the bracket 20 laterally pushed across the bush 22 so that the body portion 21 is wrapped therearound with the ends 23 projecting radially outwards.

Finally, the spread apart flanged ends 23 are squeezed together, eg by means of clamping tool, to thereby deform same so that they lie approximately parallel and in face to face relationship. The leading end of the strap 15, 17 can then be inserted between the flanged ends 23 of the bracket 20 and damped by the securing bolt 24 which passes through aligned holes 26 in the flanged ends 23 and the leading end of the strap.

Referring to FIGS. 7(a)-(d), the bush 22 is molded as two halves 28, 29 which are hinged together at 30, with the halves 28, 29 having co-operable catch or clip formations 31, 32 extending axially along their non-hinged sides and which are designed to clip together when the halves 28, 29 are wrapped around the frame members 18, 18' of the screen 11. When so clipped, the bush 22 is firmly frictionally retained in position on the frame, and facilitates the engagement of its saddle bracket 20 therearound.

The bush 22 has end perimeter flanges 33 which assist the location of the body portion 21 of the bracket 20 and prevent any relative axial displacement therebetween. The outer cylindrical surfaces of the bush 22 are desirably smooth and hard to allow the bracket 20 to readily rotate therearound.

To improve the grip of the bush 22 against the frame member, the internal walls of the halves 28, 29 are formed with protrusions 35.

It will of course be appreciated that the invention is not necessarily limited to all of the features of the above described embodiment and that variations can be made without departing from the true spirit and scope of this invention. For example, the pair of bottom straps may be relatively long with their brackets pivotally mounted on the side frame members of the frame 12 adjacent the lower ends thereof.

A brief consideration of the above described embodiment will indicate that the invention provides a vastly improved attachment means for attaching the securing straps to the perimeter frame of a vehicle safety screen, which avoids the need for the bracket attachments to be welded to the screen frame, and which allows the upper securing straps to be swung from their laterally projecting in-use positions to positions in-board of the perimeter frame to thereby facilitate the task of relocating the screen from one position to another without damaging the vehicle interior trim.

The invention claimed is:

1. An improved motor vehicle safety screen, comprising:
   an in-fill panel secured to a tubular metal perimeter frame,
   a plurality of securing straps for securing the frame to the roof and floor of the vehicle,
   attachment means for connecting one end of each said strap to a respective frame member of the perimeter frame, the other end of each said strap being adapted for connection to a respective anchorage in the vehicle floor or roof,
   wherein said attachment means of at least one of the straps includes an outer connector bracket rotatable about an axis coinciding with the axis of its associated said frame member and having an approximately C-shaped body portion terminating in a pair of spaced apart outwardly extending flanged ends in face to face relationship, and an inner bush non-rotatably mounted on the associated frame member and having a cylindrical bearing surface, said body portion of the bracket surrounding said bush and engaging said bearing surface, whereby said bracket along with its attached securing strap is able to bodily rotate around its said respective frame member, and wherein said one end of said at least one of the securing straps is fastened to the flanged ends of a respective said bracket.

2. An improved vehicle safety screen according to claim 1, wherein the connector bracket can rotate about the axis of its associated frame member to positions on opposite sides of the screen.

3. An improved vehicle safety screen according to claim 1, wherein each of the securing straps has its said one end pivotally mounted between said flanged ends of a respective said bracket by a fastening bolt, whereby the strap can rotate relative to its bracket about an axis which extends at right angles to the axis of its associated frame member.

4. An improved vehicle safety screen according to claim 1, wherein the in-fill panel is formed of metal mesh and is secured by welding to the rear sides of the perimeter frame, and wherein said bracket, along with its associated securing strap can be bodily rotated to a storage position in front of the mesh in-fill panel with the strap orientated so as to lie within the recessed area defined by the frame members of the perimeter screen frame, approximately parallel to the plane of the mesh in fill panel.

5. An improved vehicle safety screen according to claim 1, wherein each said bracket is formed of sheet metal and is initially formed, prior to its figment to the screen frame, with said flanged ends diverging outwardly, said diverging flanged ends, when the bracket is engaged on its associated bush, being squeezed together so as to lie approximately parallel with one another.

6. An improved vehicle safety screen according to claim 1, wherein said bush comprises two parts which are hinged connected to one another along an axially extending hinge line, whereby the parts of the bush can be rotated between an open position wherein they are angularly spaced apart to facilitate their figment around the associated frame member, and a closed position wherein the two parts encircle the frame member in frictional engagement therewith.

7. An improved vehicle safety screen according to claim 6, wherein said hinged parts have co-operable catch formations extending axially along their non-hinged sides and arranged so that, when the two parts are in their closed position, said parts releasably clip together.

8. An improved vehicle safety screen according to claim 7, wherein said frame member has an outer cross-sectional shape which is either square or rectangular, and the bush has an axial through bore having a shape complemental to said outer cross-sectional shape of the frame member.

9. An improved vehicle safety screen according to claim 6, wherein the bush has opposite ends formed with radially outstanding flanges between which a portion of the bracket is located to thereby inhibit relative axial movement between the bracket and the bush.

10. An improved vehicle safety screen according to claim 1, wherein the bush is molded of hard plastics material.

11. An improved vehicle safety screen according to claim 1, wherein said securing straps comprise a pair of relatively short rearwardly extending upper straps, each of which has its trailing end releasably secured to a respective anchorage point in the roof of the vehicle, and a pair of a relatively long rearwardly extending bottom straps, each of which has its trailing end removably fastened to an anchorage point in the floor of the vehicle.

12. A method of connecting an elongate metal securing strap to a perimeter frame member of a tubular metal peripheral frame of a motor vehicle safety screen or barrier, comprising the steps of:
   fitting a bush having a non-circular through-bore and an outer cylindrical hardened bearing surface co-axially onto said frame member in fixed relation therewith,
   mounting a metal saddle bracket onto said bush with its inner circumference surface engaging said bearing surface, whereby the bracket can rotate about the axis of the bush, said bracket terminating in a pair of opposing spaced apart outwardly extending flanged ends, each of which has an aperture formed therein;
   locating an apertured end of the securing strap between the pair of flanged ends of the bracket with the aperture in the strap aligned with the apertures in the flanged ends,
   inserting a bolt or similar fastener through the aligned apertures, and
   engaging a nut on the bolt and tightening same so as to clamp the strap between the flanged ends.

13. A method according to claim 12, wherein the bush is comprised of two hingedly connected parts, whereby the parts can be hinged about an axis extending axially of the bush between an open position to allow its figment laterally onto the frame member, and a closed position wherein the parts encircle the peripheral surface of the frame member in frictional engagement therewith.

14. A method according to claim 13, wherein the two parts clip together when in their closed position.

* * * * *